United States Patent [19]
Endoh et al.

[11] Patent Number: 5,754,571
[45] Date of Patent: May 19, 1998

[54] TUNABLE WAVELENGTH LIGHT SOURCE APPARATUS FOR STABILIZING POWER INTENSITY BY USING EXTERNAL AUTO-POWER CONTROL

[75] Inventors: Hiroaki Endoh, Isehara; Muneo Ishiwata, Minamiashigara; Yasuaki Nagashima, Atsugi, all of Japan

[73] Assignee: Anritsu Corporation, Tokyo, Japan

[21] Appl. No.: 561,979

[22] Filed: Nov. 22, 1995

[30] Foreign Application Priority Data

Dec. 15, 1994 [JP] Japan ................... 6-333529

[51] Int. Cl.$^6$ .................................. H01S 3/10
[52] U.S. Cl. ................. 372/20; 372/31; 372/32; 250/205
[58] Field of Search ............... 372/20, 29, 31, 372/32; 250/205

[56] References Cited

U.S. PATENT DOCUMENTS

| | | | |
|---|---|---|---|
| 3,944,817 | 3/1976 | Hilsum et al. | 250/213 VT |
| 4,187,475 | 2/1980 | Wieder | 331/94.5 |
| 5,263,951 | 11/1993 | Spears et al. | 606/12 |
| 5,311,217 | 5/1994 | Guerin et al. | 346/108 |
| 5,373,383 | 12/1994 | LaGasse | 359/161 |
| 5,477,376 | 12/1995 | Iwatsuka et al. | 359/283 |

OTHER PUBLICATIONS

Patent Abstracts of Japan, vol. 006, No. 046 (P–107), 24 Mar. 1982 & JP 06 161520 A (Fujitsu Ltd.), 11 Dec. 1981, *Abstract*.

Patent Abstracts of Japan, vol. 015, No. 115 (P–1181), 19 Mar. 1991 & JP 03 005731 A (Furukawa Electric Co., Ltd: THE), 11 Jan. 1991, *Abstract*.

Patent Abstracts of Japan, vol. 015, No. 454 (E–1135), 19 Nov. 1991 & JP 03 195076 A (Anritsu Corp.), 26 Aug. 1991, *Abstract*.

Patent Abstracts of Japan, vol. 017, No. 684 (P–1661), 15 Dec. 1993 & JP 05 232412 A (NEC Corp.), 10 Sep. 1993, *Abstract*.

Patent Abstracts of Japan, vol. 018, No. 364 (E–1575), 8 Jul. 1994 & JP 06 097602 A (Anritsu Corp.), 8 Apr. 1994, *Abstract*.

Soviet Journal of Quantum Electronics, vol. 10, No. 1, Jan. 1980, pp. 82–86, XP002032173, S.V. Andreev et al: "Stabilization of CW Laser Radiation Power by an External Control Element", *Abstract; p. 38, right column, paragraph 3; Figure 1*.

Measurement Techniques, vol. 24, No. 8, Aug. 1981, New York, U.S., pp. 649–650, XP002032221, B.M. Alentsev et al: "Acoustooptic Power Stabilizer for a Continuous laser Beam", *the whole document*.

(List continued on next page.)

*Primary Examiner*—Georgia Y. Epps
*Assistant Examiner*—Thomas Robbins
*Attorney, Agent, or Firm*—Frishauf, Holtz, Goodman, Langer & Chick

[57] ABSTRACT

To obtain a predetermined power intensity without influencing the wavelength of output light by external APC, a laser beam having a predetermined plane of polarization and output from a tunable wavelength light source passes through a Faraday element and a polarizer constituting an optical attenuator and is split into a split light beam and an output light beam by a beam splitter. The split light beam is received by a light-receiving device, and a detection signal according to the power intensity is output from the light-receiving device. A controller supplies a signal according to the difference between the detection signal output from the light-receiving device and a set value set at an intensity setting device to a coil of the Faraday element constituting the optical attenuator. The plane of polarization of the laser beam output from the Faraday element is rotated with respect to the plane of polarization of the polarizer, thereby controlling the attenuation amount of the optical attenuator such that the detection signal output from the light-receiving device always equals the set value.

33 Claims, 10 Drawing Sheets

OTHER PUBLICATIONS

E. Muller et al; "External Cavity Laser Design and Wavelength Calibration"; Feb. 1993; pp. 20–27; Hewlett–Packard Journal.

H. Schweikardt et al; External Cavity Laser Temperature Stabilization and Power Control; Feb. 1993; pp. 28–31; Hewlett–Packard Journal.

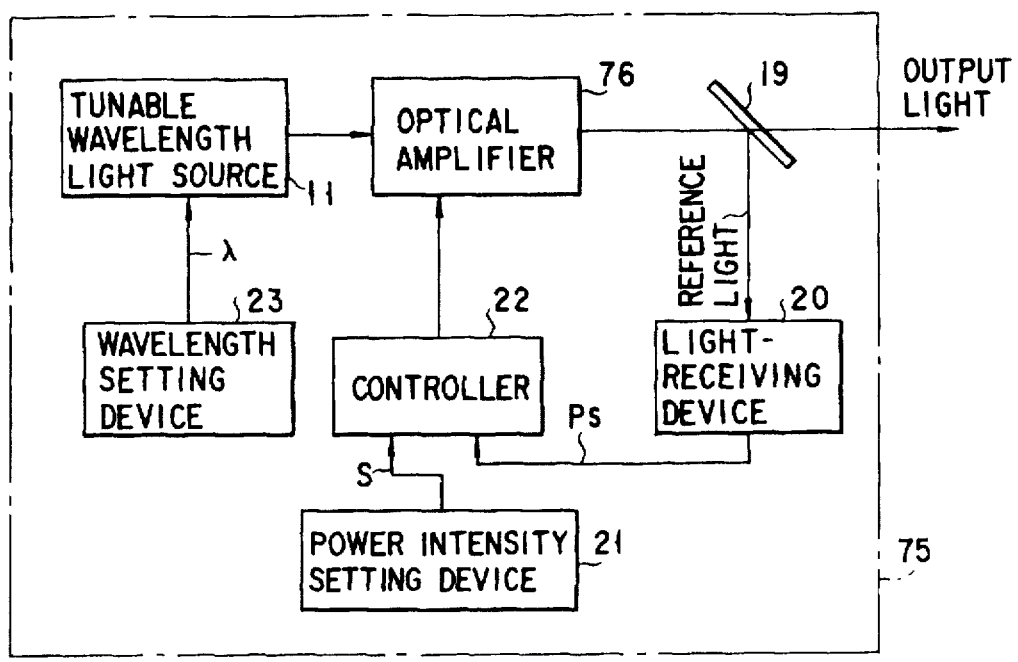
F I G. 9
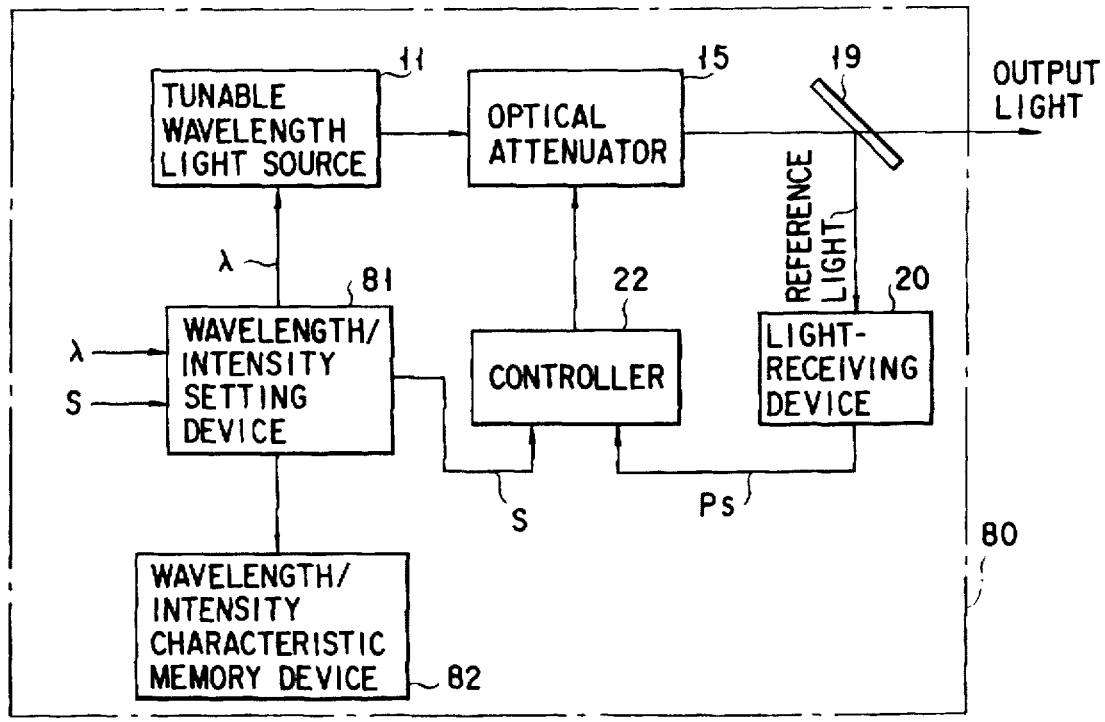
F I G. 10

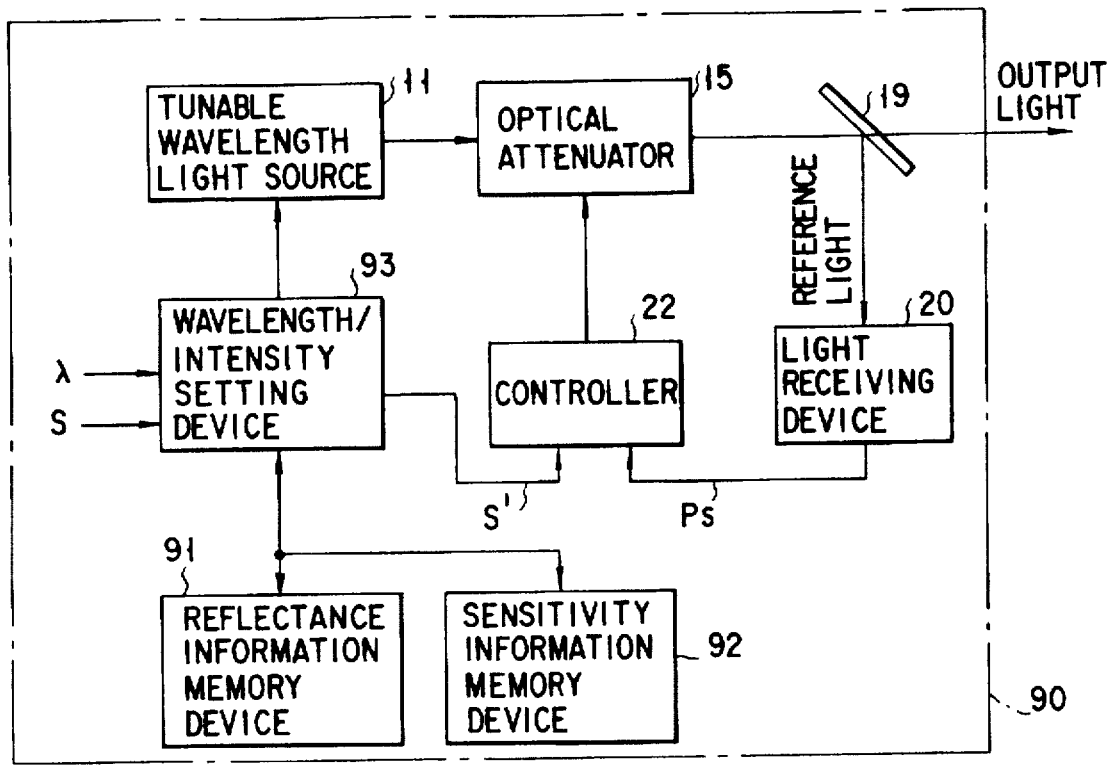
F I G. 11
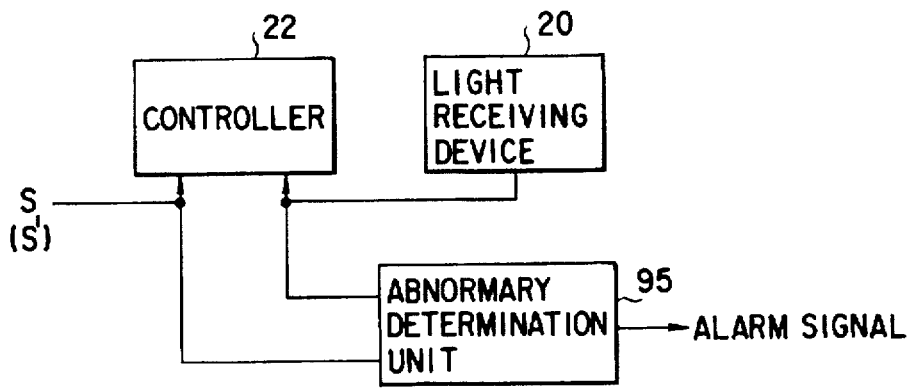
F I G. 12

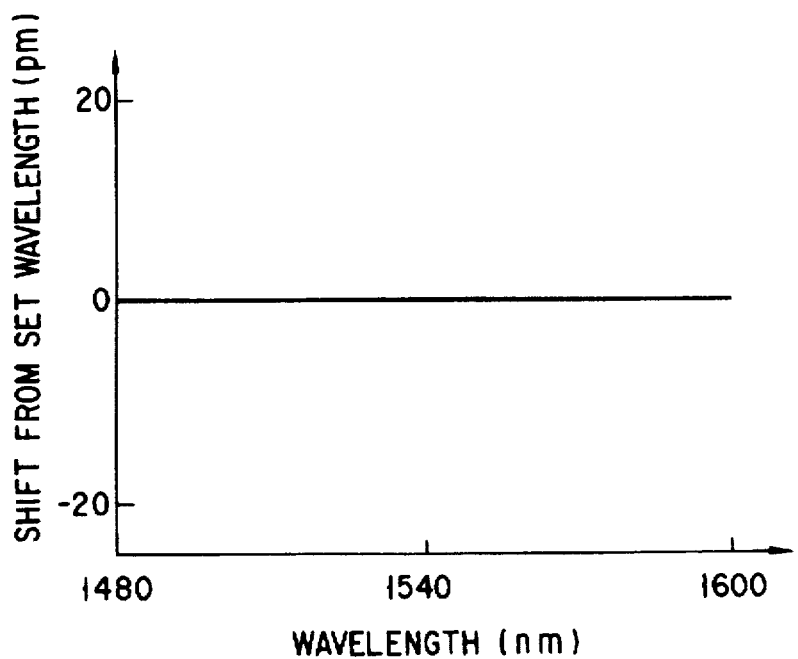
F I G. 18

TUNABLE WAVELENGTH LIGHT SOURCE APPARATUS FOR STABILIZING POWER INTENSITY BY USING EXTERNAL AUTO-POWER CONTROL

BACKGROUND OF THE INVENTION

1. Field of the Invention

The present invention relates to a tunable wavelength light source apparatus and, more particularly, to a tunable wavelength light source apparatus for stabilizing the power intensity of tunable wavelength light.

The present invention also relates to a tunable wavelength light source apparatus capable of tuning the wavelength of a laser beam and, more particularly, to a technique for controlling the power intensity of a laser beam to be constant by using external APC (auto-power control).

2. Description of the Related Art

Generally, in a tunable wavelength light source used as a light source in a tunable wavelength light source apparatus, one of a lot of modes that a semiconductor laser element can oscillate is selected by a wavelength selection unit and output.

Tunable wavelength light sources can be classified into external resonance light sources in which a semiconductor laser element and a wavelength selection unit are separated and internal resonance light sources in which a semiconductor laser element and a wavelength selection unit are integrally formed.

FIG. 15 is a block diagram showing the arrangement of a conventional tunable wavelength light source 1 of an external resonance type.

The tunable wavelength light source 1 is constituted by a semiconductor laser element 2 for emitting a laser beam upon reception of power supply, and a wavelength selection unit 3 for returning, of the laser beam output from an anti-reflection coating on one end of the semiconductor laser element 2, only a laser component having a predetermined wavelength to the semiconductor laser element 2.

When the wavelength selection unit 3 is constituted by a diffraction grating, the wavelength of the laser beam output from the semiconductor laser element 2 can be tuned by rotating the diffraction grating.

The power intensity of the tunable wavelength light source of this type generally has wavelength characteristics as shown in FIG. 16. The power intensity changes in accordance with a change in wavelength. The power intensity also varies in accordance with a change in ambient temperature or the like.

For this reason, when such a tunable wavelength light source is used as a light source for measurement which requires high accuracy, the power intensity of the laser beam must be stabilized.

To solve this problem, conventionally, a current (active layer current) I supplied to the semiconductor laser element 2 in the tunable wavelength light source 1 is directly changed and controlled by so-called internal APC (auto-power control), thereby stabilizing the power intensity of the laser beam.

However, in the technique using internal APC in which the current injected to the active layer of the semiconductor laser element is changed to control the power intensity to be constant, the optical characteristics in the semiconductor laser element 2 also change in accordance with a change in the injected current. This results in a fluctuation in wavelength of output light, or hopping (called mode hopping) of the wavelength of the output light to a wavelength different from a desired wavelength.

Particularly, when the active layer current is largely changed to control the intensity to be stable throughout a wide wavelength range as shown in FIG. 16, mode hopping easily occurs in a tunable wavelength light source of an external resonance type, which has a large resonance length and a small mode interval.

FIGS. 17A to 17C are graphs showing the process in which mode hopping and wavelength fluctuation in output light occur.

FIG. 17A shows the relationship between the output wavelength of 1,480 to 1,600 (nm) and the LD output light power (dBm) obtained when a laser diode (LD) is used as a semiconductor laser element and a predetermined current IA of 180 mA is supplied to the active layer of the LD. As shown in FIG. 17A, the power intensity exhibits a peaked curve with respect to the wavelength.

FIG. 17B shows change characteristics obtained when the injected current is changed such that the LD having the above output characteristics can be swept with a predetermined power intensity (−6 dBm) at a wavelength of 1,480 to 1,600 (nm). The characteristics show a curve substantially opposite to that in FIG. 17A.

FIG. 17C shows a wavelength shift caused in accordance with a change in injected current. Mode hopping occurs at two points, i.e., at a wavelength 1,500 nm and at a wavelength of 1,590 nm. The shift becomes almost q10 (pm) with respect to a set wavelength at maximum.

Such a wavelength fluctuation occurs even in a tunable wavelength light source of an internal resonance type. In a tunable wavelength light source of either an external resonance type or an internal resonance type, output light having a predetermined intensity can be hardly obtained without influencing the wavelength.

SUMMARY OF THE INVENTION

It is, therefore, an object of the present invention to provide a new and improved tunable wavelength light source apparatus in which a laser beam having a predetermined intensity can be output without influencing the wavelength of output light by using an external APC to stabilize the power intensity.

According to an aspect of the present invention, there is provided a tunable wavelength light source apparatus comprising:

a tunable wavelength light source for outputting a laser beam whose wavelength can be tuned;

power intensity variable means for varying an intensity of the laser beam from the tunable wavelength light source;

beam splitting means for splitting the laser beam into an output light component and a reference light component at a rear or front stage of the power intensity variable means;

light-receiving means for receiving the reference light component split by the beam splitting means to detect a power intensity; and control means for controlling the power intensity variable means so as to coincide a power intensity detection signal from the light-receiving means and a set value corresponding to a desired power intensity, such that the power intensity of the output light component output from the beam splitting means directly or through the power intensity variable means coincides with the desired power intensity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a block diagram showing the overall arrangement of still another embodiment of the present invention;

FIG. 10 is a block diagram showing the overall arrangement of still another embodiment of the present invention;

FIG. 11 is a block diagram showing the overall arrangement of still another embodiment of the present invention;

FIG. 12 is a block diagram showing the arrangement of the main part of still another embodiment of the present invention;

FIG. 18 is a graph showing the power intensity stabilizing characteristics of the apparatus of the present invention, which causes neither wavelength fluctuation nor mode hopping.

DETAILED DESCRIPTION OF THE PREFERRED EMBODIMENTS

Figure 1:
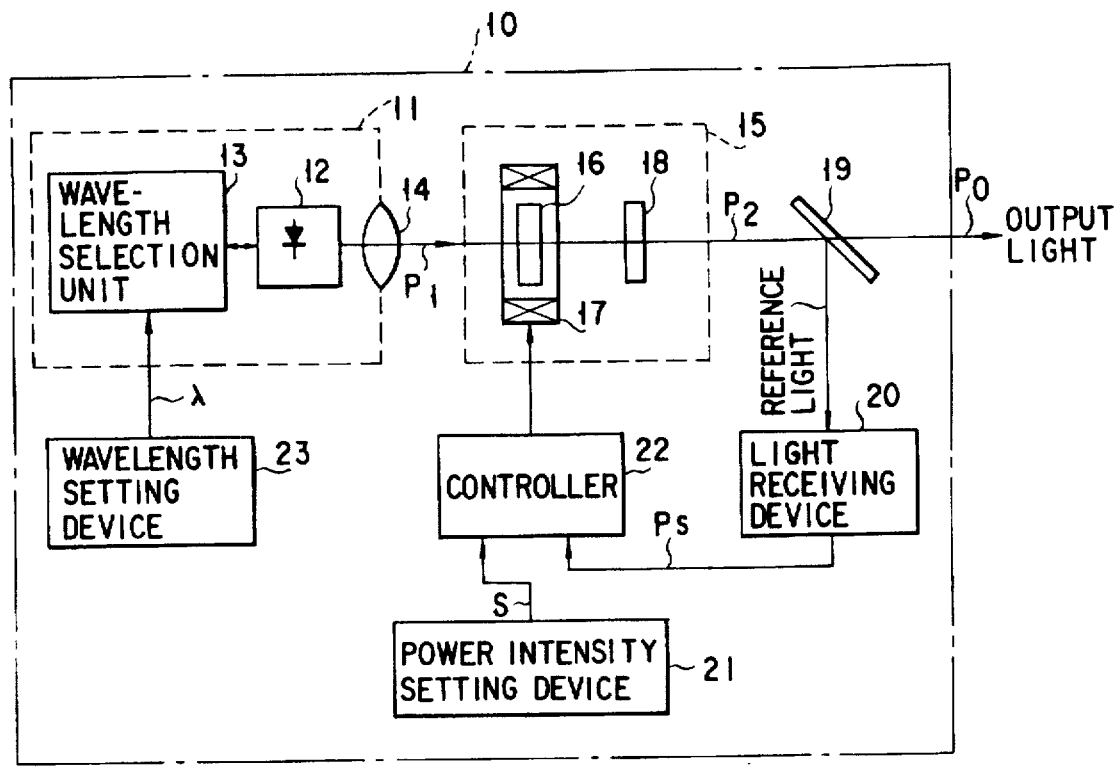
FIG. 1 is a block diagram showing the overall arrangement of an embodiment of the present invention.

Reference will now be made in detail to the presently preferred embodiments of the invention as illustrated in the accompanying drawings, in which like reference characters designate like or corresponding parts throughout the several drawings.

A summary of the invention will be described. In order to solve the above problem, according to the present invention, there is provided a tunable wavelength light source apparatus comprising a tunable wavelength light source for oscillating a laser beam and tuning the wavelength of the laser beam, beam splitting means for splitting part of the laser beam output from the tunable wavelength light source, intensity detection means for receiving the split light beam split by the beam splitting means and outputting a detection signal according to the intensity of the split light beam, intensity variable means for receiving the laser beam output from the tunable wavelength light source, attenuating or amplifying the intensity of the laser beam and outputting the laser beam while tuning an attenuation amount or amplification factor in accordance with a control signal, and control means for receiving the detection signal output from the intensity detection means, changing the control signal sent to the intensity variable means in accordance with a change in detection signal, and performing control such that the laser beam output from the intensity tunable means has a predetermined intensity.

With this arrangement, in the tunable wavelength light source apparatus of the present invention, when the intensity of the laser beam output from the tunable wavelength light source is changed by wavelength tuning, the intensity of the split light beam from the beam splitting means also changes, and the detection signal from the light-receiving means changes accordingly. In accordance with a change in detection signal, the control means changes and controls the control signal sent to the intensity variable means such that the laser beam output from the intensity tunable means has a predetermined intensity.

(First Embodiment)

An embodiment of the present invention will be described below with reference to the accompanying drawings.

FIG. 1 is a block diagram showing the arrangement of a tunable wavelength light source apparatus 10 according to an embodiment to which the present invention is applied.

A tunable wavelength light source 11 used in this tunable wavelength light source apparatus 10 is of an external resonance type and comprises a semiconductor laser (diode) element 12 driven with a predetermined current injected in the active layer, a wavelength selection unit 13 arranged on one end side of the semiconductor laser element 12, and a lens 14 for collimating a laser beam output from the other end side of the semiconductor laser element 12 and outputting the laser beam externally. The optical conditions of the wavelength selection unit 13 are changed by external control to change the wavelength of the laser beam oscillated from the semiconductor laser element 12.

Figure 2:
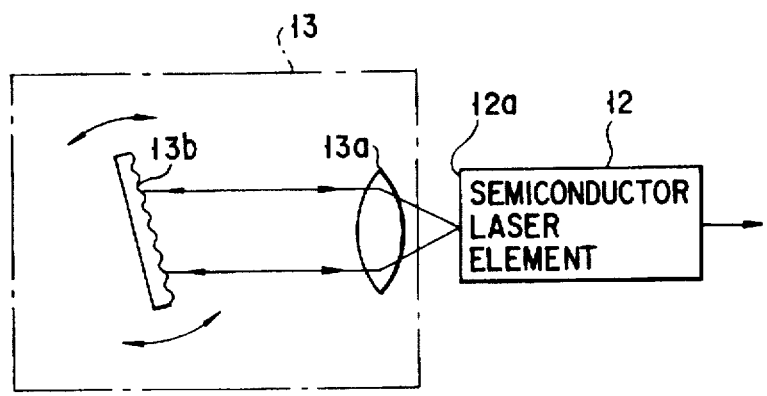
FIG. 2 is a block diagram showing the main part of the embodiment.

As shown in FIG. 2, the wavelength selection unit 13 comprises a lens 13a for collimating a laser beam output from an anti-reflection coating on one end side 12a of the semiconductor laser element 12, and a diffraction grating 13b for receiving the collimated laser beam and returning only a laser component having a desired wavelength to the semiconductor laser element 12 side. The diffraction grating 13b is pivoted by a pivoting device (not shown) to select a wavelength. The angle of the diffraction grating 13b is set to an angle according to wavelength information λ from a wavelength setting device 23 (to be described later).

Figure 3:
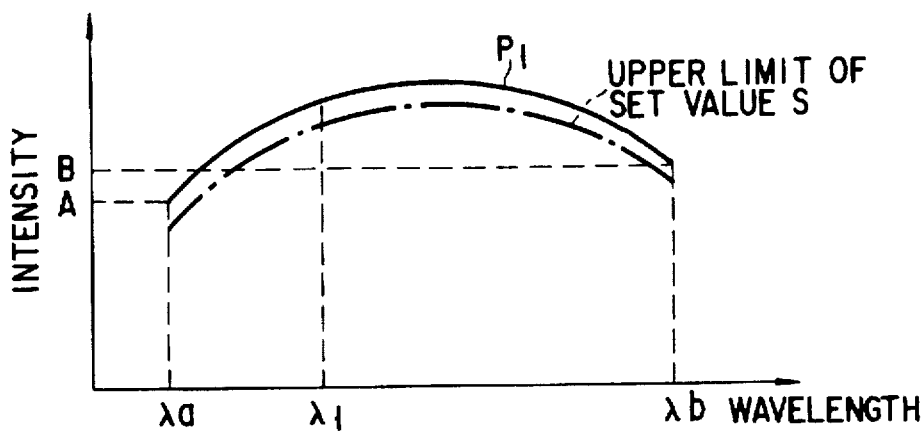
FIG. 3 is a graph showing a change in power intensity with respect to the wavelength in the main part of the embodiment.

As shown in FIG. 3, an intensity $P_l$ of output light from the tunable wavelength light source 11 has unimodal characteristics with respect to the wavelength: the intensity increases as the wavelength becomes long from a minimum wavelength λa toward an intermediate wavelength portion, and decreases from the intermediate wavelength portion toward a maximum wavelength λb. An intensity A of the minimum wavelength λa is slightly lower than an intensity B of the maximum wavelength λb.

A laser beam output from the tunable wavelength light source 11 and having a predetermined plane of polarization is input to an optical attenuator 15 serving as a power intensity tunable means by external APC of this embodiment. Various elements can be used as the optical attenuator 15. In this embodiment, a Faraday element is used.

Figure 4:
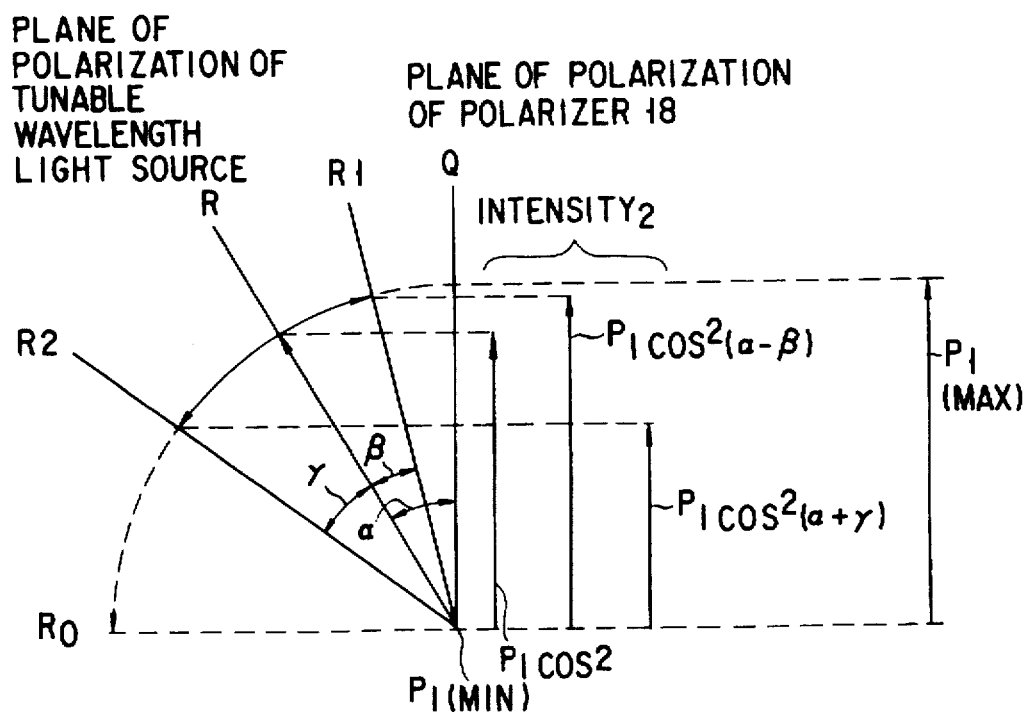
FIG. 4 is a view for explaining an attenuation operation by rotation of the plane of polarization.

The optical attenuator 15 is constituted by a Faraday element 16 for rotating the plane of polarization of incident light by an angle according to the intensity of an applied magnetic field, a coil 17 for applying a magnetic field to the Faraday element 16, and a polarizer 18 for outputting, of light components having a fixed plane of polarization and passing through the Faraday element 16, only a component coinciding with the plane of polarization. As shown in FIG. 4, a plane of polarization Q of the polarizer 18 is shifted by a predetermined angle α (e.g., 30°) with respect to a plane of polarization R of the laser beam output from the tunable wavelength light source 11.

In a reference state, i.e., when no magnetic field is applied (when no current is supplied to the coil 17), the Faraday element 16 outputs light to the polarizer 18 without changing the plane of polarization of incident light.

In the reference state wherein no magnetic field is applied to the Faraday element 16, therefore, when the loss in the Faraday element 16 and the polarizer 18 is ignored, an intensity $P_2$ of the laser beam output from the polarizer 18 is $P_1 \cos^2 \alpha$ a with respect to the intensity $P_1$ of the laser beam output from the tunable wavelength light source 11, giving an attenuation of $\cos^2 \alpha$.

When a magnetic field of a polarity is applied to the Faraday element 16, and the plane of polarization R of the laser beam incident on the polarizer 18 is rotated clockwise to a position $R_1$ by an angle β which is smaller than the angle α, the intensity $P_2$ of the laser beam output from the polarizer 18 increases to $P_1 \cos^2 (\alpha-\beta)$. When the plane of polarization of the laser beam incident on the polarizer 18 is further rotated to coincide with the plane of polarization Q of the polarizer 18, the intensity $P_2$ of the laser beam output from the polarizer 18 reaches the maximum value $P_1$.

To the contrary, when a magnetic field of the opposite polarity is applied to the Faraday element 16, and the plane of polarization R of the laser beam incident on the polarizer 18 is rotated counterclockwise to a position $R_2$ by an angle γ which is smaller than (90°−α), the intensity $P_2$ of the laser beam output from the polarizer 18 decreases to $P_1 \cos^2(\alpha+\gamma)$. When the plane of polarization of the laser beam incident on the polarizer 18 is rotated to a position $R_0$ having an angle of 90° with respect to the plane of polarization Q, the intensity $P_2$ of the laser beam output from the polarizer 18 reaches its minimum value.

The laser beam attenuated by the optical attenuator 15 and passing through the optical attenuator 15 is input to a beam splitter 19. The beam splitter 19 is formed of a member which has a light transmittance T close to unity like a glass plate, and has a very small change of (transmittance T (reflectance 1−T)) with respect to the difference in wavelength of the laser beam output from the tunable wavelength light source 11. The beam splitter 19 splits the laser beam having the intensity $P_2$ which is output from the optical attenuator 15 into an output laser component having an intensity $T \cdot P_2$ and a reference laser component having an intensity of $(1-T) \cdot P_2$. The loss in the beam splitter 19 itself is ignored herein.

The split light beam split by the beam splitter 19 is received by a light-receiving device 20 serving as a power intensity detection means. The light-receiving device 20 outputs a detection signal Ps having a magnitude proportional to the intensity $(1-T) \cdot P_2$ of the input reference light beam, i.e., a magnitude proportional to a power intensity Po $(=T \cdot P_2)$.

A set value S for setting the power intensity Po of the tunable wavelength light source apparatus 10 is set at a power intensity setting device 21 from an operation unit, an external device, or the like (not shown).

The laser beam output from the tunable wavelength light source 11 is output via the optical attenuator 15 and the beam splitter 19. For this reason, the upper limit of the set value S which can be set at the power intensity setting device 21 is limited to a value below the intensity $P_1$ of the laser beam output from the tunable wavelength light source 11, as indicated by an alternate short and dashed line in FIG. 3. When a laser beam having a predetermined intensity is to be output within the range from the wavelength λa to the wavelength λb shown in FIG. 3, the intensity A of the laser beam at the wavelength λa is the maximum value of the set value S because the intensity A at the wavelength λa is lower than the intensity B at the wavelength λb.

The set value S is input to a controller 22 together with the power intensity detection signal Ps detected by the light-receiving device 20. The controller 22 is constituted by, e.g., a differential amplifier having a very large gain. The controller 22 detects the difference between the set value S and the detection signal Ps, supplies an amplified output of the difference component to the coil 17 of the Faraday element 16 constituting the optical attenuator 15 as a control signal to change the direction and intensity of the magnetic field applied to the Faraday element 16, thereby controlling the attenuation amount of the optical attenuator 15 such that the power intensity Po equals the set value S.

When the detection signal Ps is larger than the set value S, the plane of polarization of the laser beam output from the Faraday element 16 in FIG. 4 is rotated counterclockwise to increase the attenuation amount of the optical attenuator 15 until the detection signal Ps output from the light-receiving device 20 equals the set value S. To the contrary, when the detection signal Ps is smaller than the set value S, the plane of polarization of the laser beam output from the Faraday element 16 is rotated clockwise to decrease the attenuation amount of the optical attenuator 15 until the detection signal Ps equals the set value S. With this operation, the power intensity Po can always be kept constant.

A wavelength setting device 23 sends the wavelength information λ set from an operating unit, an external device, or the like (not shown) to the tunable wavelength light source 11 and causes the tunable wavelength light source 11 to output a laser beam having a wavelength corresponding to the wavelength information.

As described above, in the tunable wavelength light source apparatus 10, even when the power intensity of the tunable wavelength light source 11 is changed by the wavelength tuning operation or a change in environment, the intensity of a laser beam output from the tunable wavelength light source apparatus 10 is kept at a predetermined value by the above-mentioned external APC.

Figure 17A:
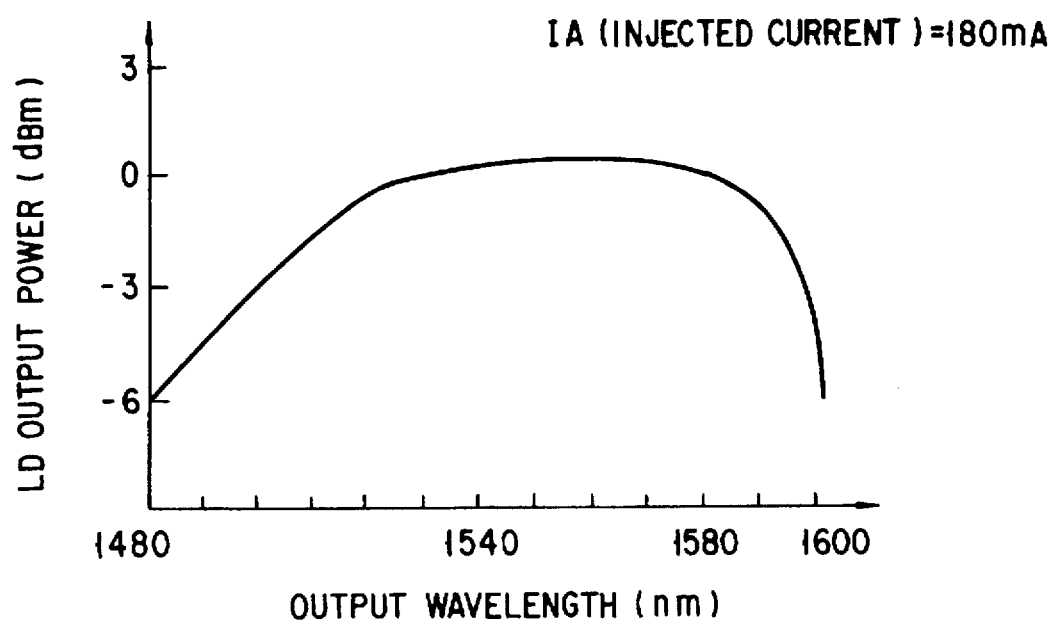
FIGS. 17A to 17C are graphs showing the process in which wavelength fluctuation and mode hopping occur in the conventional apparatus.
Figure 17B:
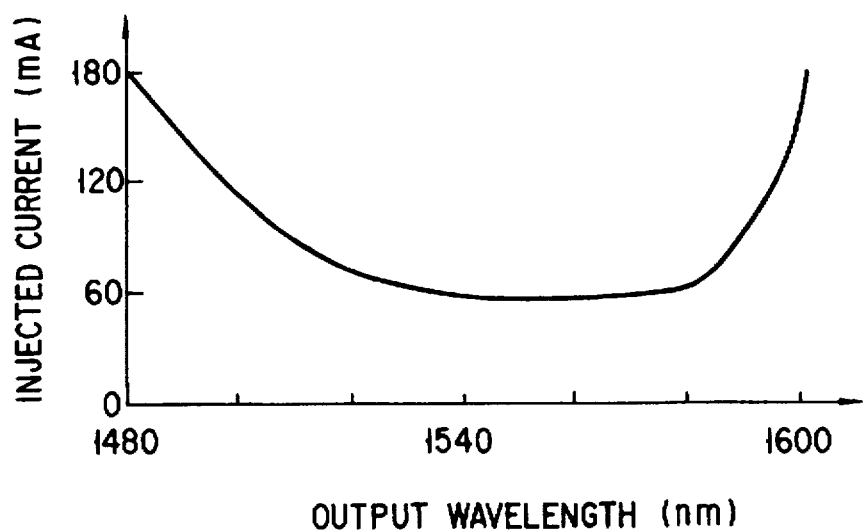
Figure 17C:
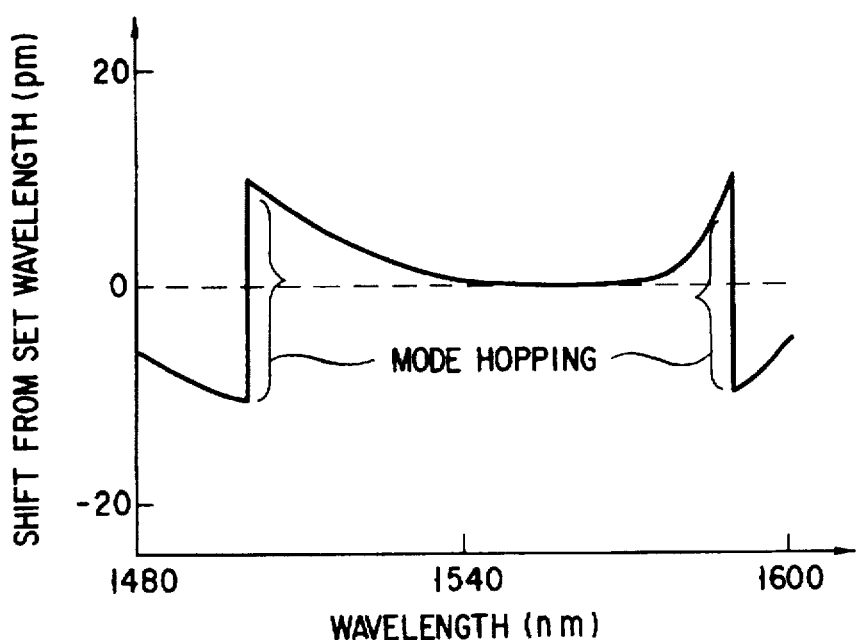

External APC is performed for a laser beam output from the tunable wavelength light source 11 without changing the current injected to the active layer of the semiconductor laser element 12 in the tunable wavelength light source 11. As shown in FIG. 18, no shift from a set wavelength occurs in external APC, unlike the conventional apparatus, so neither mode hopping nor wavelength fluctuation occurs. Since a laser beam having stable intensity and wavelength is output, a large improvement can be achieved as compared FIG. 17C showing the conventional apparatus. Therefore, even when a response characteristic of various optical components or devices with respect to the wavelength is to be measured, a laser beam output from the tunable wavelength light source apparatus 10 can be used to perform sufficiently accurate measurement.

The laser beam passing through the optical attenuator 15 is split into an output light beam and a reference light beam, and the attenuation amount of the optical attenuator 15 is controlled on the basis of the intensity of the reference light beam. For this reason, influence of characteristic variation (variation in attenuation amount depending on the wavelength of input light or a change in environment) of the optical attenuator 15 itself or non-linearity of the attenuation amount can be eliminated.

The reference state of the optical attenuator 15 of this embodiment is defined as a state wherein the plane of polarization Q of the polarizer 18 is set to have the predetermined angle a with respect to the plane of polarization R of a laser beam output from the tunable wavelength light source 11 so as not to apply a magnetic field to the Faraday element 16. However, the reference state may also be defined as a state wherein the plane of polarization of the polarizer 18 coincides with that of the laser beam output from the tunable wavelength light source 11, and a magnetic field is applied to the Faraday element 16 such that the plane of polarization of the laser beam output from the tunable wavelength light source 11 is rotated by the predetermined angle α.

(Another Embodiment)

In the above embodiment, the tunable wavelength light source of an external resonance type in which a wavelength selection unit is arranged outside of the semiconductor laser element is used. However, as in a tunable wavelength light source 30 or 40 shown in FIG. 5A or 5B, a tunable wavelength light source element 31 or 41 of an integral type may also be used.

Figure 5A:
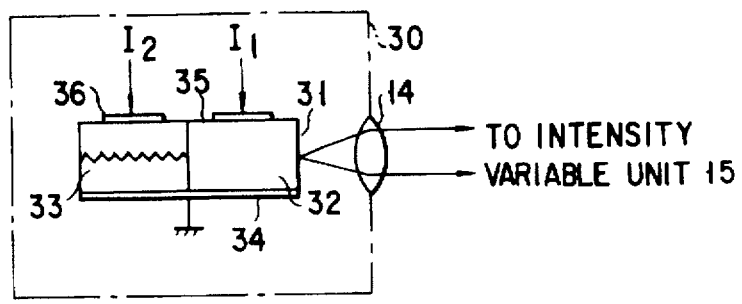
FIGS. 5A and 5B are block diagrams showing the main parts of other embodiments of the present invention.

FIG. 5A shows the structure of the tunable wavelength light source element 31 of a distributed Bragg-reflection (DBR) type in which an active layer 32 for generating a laser beam and a wavelength selection unit 33 whose refractive index changes in accordance with the supplied current are arranged adjacent to each other on a common electrode 34, and first and second electrodes 35 and 36 are arranged on the active layer 32 and the wavelength selection unit 33, respectively.

In the tunable wavelength light source 30, a predetermined current $I_1$ is supplied to the active layer 32 of the tunable wavelength light source element 31 to excite laser oscillation. In this state, a current $I_2$ to the wavelength selection unit 33 is changed in correspondence with wavelength information λ from a wavelength setting device 23 to tune the wavelength of the laser beam output from the active layer 32. The tunable wavelength light source 30 of this type can tune the wavelength by controlling the current supplied to the wavelength selection unit 33 and is suitable for high-speed sweep of the wavelength of output light.

Figure 5B:
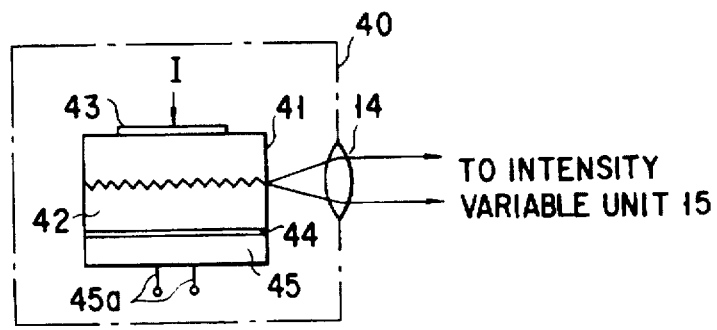

FIG. 5B shows the structure of the tunable wavelength light source element 41 of a distributed feedback (DFB) type in which an element main body 42 having an integrated function of an active layer and a wavelength selection unit is arranged between electrodes 43 and 44, and a temperature variable element 45 such as a Peltier element is arranged on the electrode 44 side.

The element main body 42 outputs a laser beam having a wavelength determined by the temperature of the element main body 42 when a predetermined current I is supplied. The wavelength of the output laser beam is tuned to a desired wavelength by controlling energization to a terminal 45a of the temperature variable element 45 in correspondence with the wavelength information λ from the wavelength setting device 23 to change the temperature of the element main body 42.

Even when the tunable wavelength light source 30 or 40 constituted by the tunable wavelength light source element 31 or 41 of an integral type is used, the intensity of an output laser beam changes in accordance with a change in environment such as an ambient temperature or a wavelength tuning operation, as in the tunable wavelength light source of an external resonance type. However, by the same feedback control as in the above embodiment, the power intensity can be stabilized without causing wavelength fluctuations.

Figure 6:
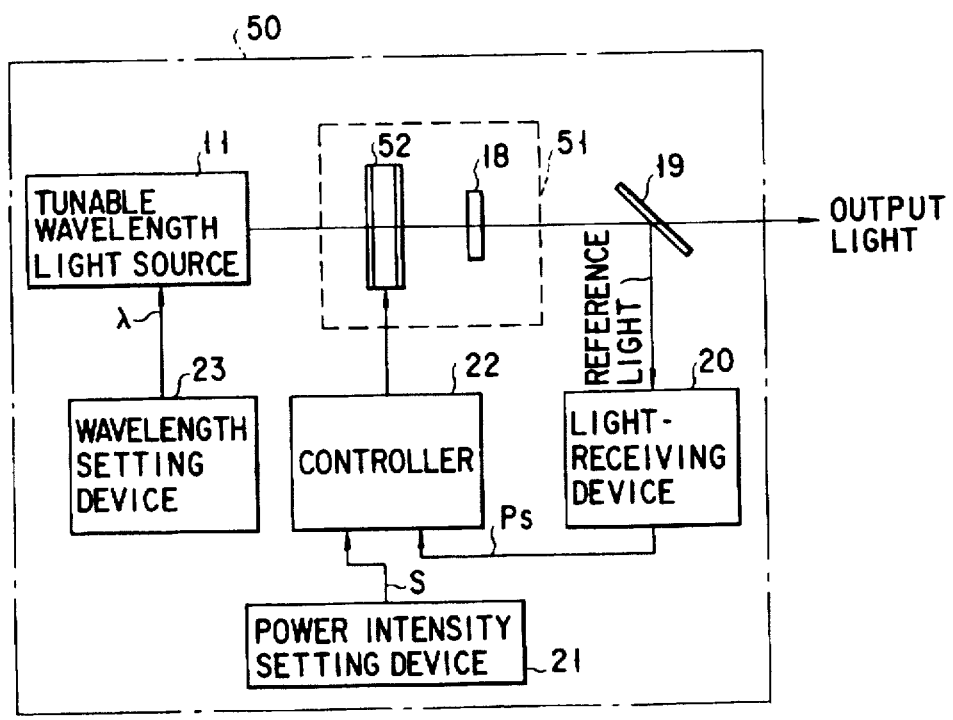
FIG. 6 is a block diagram showing the overall arrangement of still another embodiment of the present invention.

In the above embodiment, the optical attenuator 15 having the Faraday element 16, the coil 17, and the polarizer 18 is used as a power intensity control means. However, as in an optical attenuator 51 of a tunable wavelength light source apparatus 50 shown in FIG. 6, the plane of polarization of a laser beam output from the tunable wavelength light source 11 may be rotated by a liquid crystal element 52 and output to a polarizer 18, and a voltage applied to the liquid crystal element 52 may be controlled by the controller 22 to change the attenuation amount and control the power intensity constant. In this case, the power consumption can be decreased as compared to an apparatus using a coil as in the above embodiment.

When the plane of polarization of a laser beam output from the tunable wavelength light source is rotated by the Faraday element 16 or the liquid crystal element 52 to control the intensity, and the laser beam output from the tunable wavelength light source is a linearly polarized light beam, the power intensity can be monotonically changed in accordance with the rotation amount of the polarized light beam. However, for an elliptically polarized laser beam having an X-axis component and a Y-axis component, it is difficult to monotonically change the power intensity in accordance with the rotation amount of the polarized light beam. Therefore, when a tunable wavelength light source for outputting an elliptically polarized laser beam and a power intensity variable unit of a polarization plane rotating type are used, a polarizer must be arranged between the tunable wavelength light source and the intensity tunable unit. With this arrangement, the elliptically polarized laser beam output from the tunable wavelength light source can be converted to a linearly polarized light beam by the polarizer and then input to the power intensity variable unit.

In addition to the optical attenuator using rotation of the plane of polarization, a device of optical attenuation type using an electrooptic effect or acoustooptic effect using lithium niobate ($LiNbO_3$), or a device of an optical amplification type using an LD (semiconductor laser) amplifier or a fiber amplifier may also be used.

This will be described below in detail.

Figure 7:
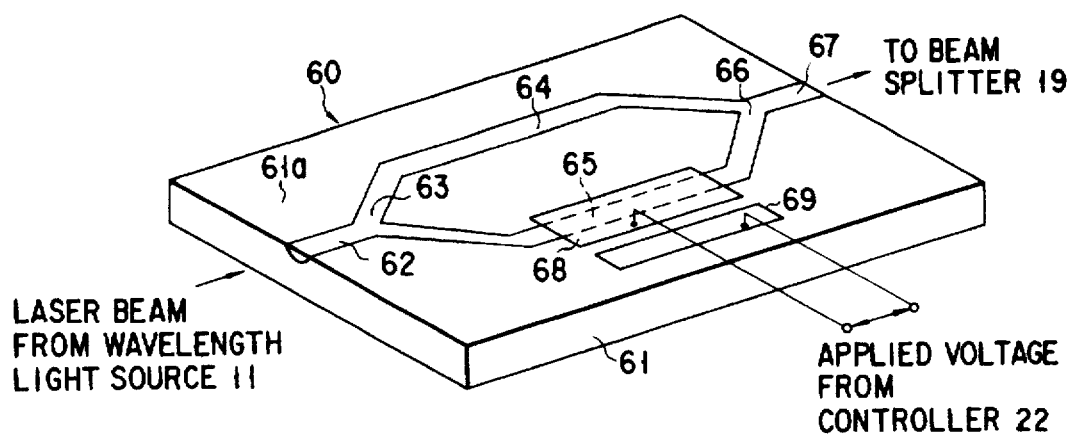
FIG. 7 is a perspective view of the main part of still another embodiment of the present invention.

FIG. 7 is a perspective view showing an MZ (Mach-Zender) interference modulator 60 which is one of interferometers using LN (LiNbO$_3$) and usable as a power intensity variable means of an optical attenuation type.

The MZ interference modulator 60 is constituted by an input waveguide 62 arranged on one end side of a surface 61a of an LN crystal plate 61, a Y branch portion 63 arranged at the distal end of the waveguide 62, waveguides 64 and 65 branched at the Y branch portion 63, a Y coupling portion 66 for coupling the distal ends of the two waveguides 64 and 65, an output waveguide 67 connected to the Y coupling portion 66 and extending up to the other end side of the surface 61a of the LN crystal plate 61, and a pair of electrodes 68 and 69 for applying an electric field to the waveguide 65.

In the MZ interference modulator 60 having the above arrangement, a light beam input from the input waveguide 62 is branched into light beams having an equal intensity by the Y branch portion 63 and guided to the two waveguides 64 and 65. One light beam propagating through the waveguide 64 is input to the Y coupling portion 66 without any change in phase. The other light beam propagating through the waveguide 65 is input to the Y coupling portion 66 while the phase is delayed (or advanced) in accordance with the intensity of an electric field applied through the pair of electrodes 68 and 69. For this reason, the light beams having an equal intensity and different phases interfere with each other at the Y coupling portion 66. A light beam whose intensity is attenuated from the input light beam by an amount corresponding to the phase difference is output from the output waveguide 67.

Therefore, when a laser beam output from the tunable wavelength light source 11 of the above embodiment is input from the input waveguide 62, a laser beam output from the output waveguide 67 is output to the beam splitter 19, and a voltage for always equalizing the power intensity detection signal Ps which is detected upon reception of a reference light beam by the light-receiving device 20 with the set value S is applied from the controller 22 between the electrodes 68 and 69, the intensity of output light transmitted through the beam splitter 19 can be stabilized, as in the above embodiment.

In this example, the electric field is applied from the controller 22 to only one of the two-branched waveguides 64 and 65 through the electrodes. However, when electric fields having polarities opposite to each other are applied to the two-branched waveguides such that the phase of the light beam propagating through one waveguide is advanced while the phase of the light beam propagating through the other waveguide is delayed, the attenuation amount can be largely changed with a low applied voltage.

As a device for changing the attenuation amount with respect to an input light beam by applying an electric field to a waveguide, there is, e.g., a traveling wave optical modulator or a balance bridge optical modulator. Such an optical modulator can also be used as a power intensity variable means of the present invention.

Figure 8A:
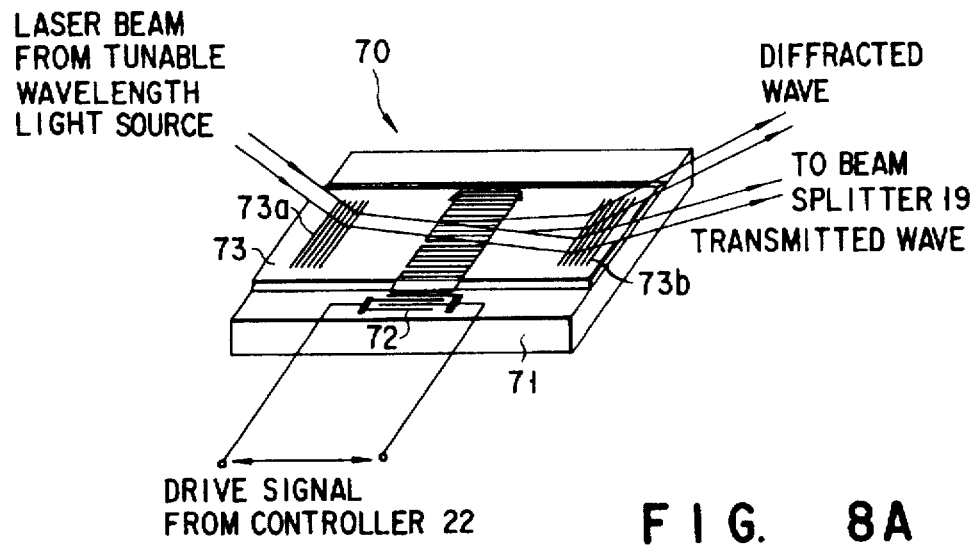
FIGS. 8A and 8B are views showing the arrangement and characteristics of the main part of still another embodiment of the present invention.

FIG. 8A is a perspective view showing the structure of an optical modulator 70 called an acoustooptic Bragg cell. The modulator 70 is constituted by a piezoelectric substrate 71 consisting of a crystal or lithium niobate, a surface acoustic wave (SAW) transducer 72 formed on the surface of the piezoelectric substrate 71, and a non-piezoelectric thin film waveguide 73 consisting of sputter glass or the like and formed on the upper surface of the SAW transducer 72. An input grating coupler 73a and an output grating coupler 73b are formed at the two ends of the non-piezoelectric thin film waveguide 73, respectively.

In the optical modulator 70 having the above structure, a laser beam input from the outside to the non-piezoelectric thin film waveguide 73 through the input grating coupler 73a propagates to the output grating coupler 73b side. Since this laser beam crosses the propagation path of a wave generated by the SAW transducer 72 midway, the optical path of the light beam is partially changed. For this reason, light beams of a transmitted wave and a diffracted wave are output from the output grating coupler 73b in different directions. The power intensity of the transmitted wave changes in almost inverse proportion to the intensity of a signal supplied to the SAW transducer 72.

Therefore, when a laser beam output from the tunable wavelength light source 11 of the above embodiment is input to the input grating coupler 73a of the optical modulator 70, a laser beam on the transmitted wave side (or diffracted wave side) which is output from the output grating coupler 73b is output to the beam splitter 19, and the intensity of a signal supplied to the SAW transducer 72 is controlled by the controller 22 such that the detection signal Ps detected upon reception of the split light beam by the light-receiving device 20 equals the set value S, the intensity of output light transmitted through the beam splitter 19 can be stabilized, as in the above embodiment.

In this example, the light beam is input/output through a grating coupler. However, a light beam may be directly input/output from the end face of the non-piezoelectric thin film waveguide 73. As an acoustooptic Bragg cell of this type, there is also a device having a Ti diffused waveguide formed on a lithium niobate substrate, or a device having a cross channel waveguide. Any of these devices may also be used as a power intensity variable means.

In the above embodiment, the optical attenuator 15 is used as a power intensity variable means. However, as in a tunable wavelength light source apparatus 75 shown in FIG. 9, an optical amplifier 76 may be used as a power intensity variable means, and the amplification factor of the optical amplifier 76 may be controlled in accordance with a control signal from the controller 22 to keep a predetermined power intensity.

As the optical amplifier 76, a semiconductor laser amplifier which uses a semiconductor laser element as an amplification element and amplifies and outputs input light in accordance with the current injected to the semiconductor laser, or a fiber amplifier can be used.

When a semiconductor laser amplifier is used as an optical amplifier, the amplification factor is controlled by changing the current injected to the semiconductor laser element. The semiconductor laser amplifier has a high-speed response and can attenuate input light when the injected current is small. Therefore, the power intensity can be changed within a wide range.

When a fiber amplifier is used as an optical amplifier, the current injected to an exciting semiconductor laser element is changed to control the amplification factor.

When the power intensity variable means of an amplification type is used, output light having an intensity larger than the laser beam output from the tunable wavelength light source 11 can be stably obtained.

In these optical amplifiers, the wavelength band which can be amplified is limited. In addition, in many cases, the amplification factor changes in accordance with the wavelength. However, as long as the wavelength band of the optical amplifier, which can be amplified, coincides with the wavelength tunable band of the tunable wavelength light source 11, a laser beam having a predetermined intensity can always be output by control of the controller 22 without being influenced by a change in amplification factor caused by the wavelength of the optical amplifier itself.

In the above embodiment, the power intensity setting device 21 and the wavelength setting device 23 are independently arranged. However, as in a tunable wavelength light source apparatus 80 shown in FIG. 10, setting of the wavelength λ for the tunable wavelength light source 11 and output of the set value S to the controller 22 may also be performed by a wavelength/ intensity setting device 81. In addition, a wavelength/ intensity memory device 82 storing the intensity vs. wavelength characteristics of a laser beam output from the tunable wavelength light source 11 (characteristics shown in FIG. 3) in advance may be arranged. When the set value S and the wavelength λ are set at the wavelength/intensity setting device 81 in accordance with an instruction from an operating unit (not shown), the wavelength/intensity setting device 81 reads intensity information corresponding to the set wavelength λ from the wavelength/intensity memory device 82, and calculates the upper limit value of the set value within a range for controlling the laser beam having this wavelength to a predetermined intensity. The calculated value is compared with the external set value S. When the set value S is larger than the upper limit value, alarm display may be performed by a display unit (not shown), or a warning sound may be output.

To the contrary, the wavelength/intensity setting device 81 reads a wavelength range which can be output at an intensity corresponding to the set value S from the wavelength/intensity memory device 82 and determines whether the externally set wavelength falls within this wavelength range. If the set wavelength information falls outside of the wavelength range, alarm display may be performed by a display unit, or a warning sound may be output.

In the above embodiment, a case wherein the transmittance (reflectance) of the beam splitter 19 or the sensitivity of the light-receiving device 20 hardly depends on the wavelength has been described. In fact, the transmittance (reflectance) of the beam splitter 19 or the sensitivity of the light-receiving device 20 has a small dependence on wavelength. The power intensity slightly varies due to this dependence on wavelength.

When such variations in intensity cannot be ignored, as in a tunable wavelength light source apparatus 90 shown in FIG. 11, a reflectance information memory device 91 storing the reflectance information of the beam splitter 19 for each wavelength, a sensitivity information memory device 92 storing the sensitivity information of the light-receiving device 20 for each wavelength, and a wavelength/intensity setting device 93 are arranged. Upon reception of the wavelength information λ and the set value S from an external device, the wavelength/intensity setting device 93 reads the reflectance information of the beam splitter 19 and the sensitivity information of the light-receiving device 20, which correspond to the wavelength, from the memory devices 91 and 92, respectively. When a correction value S' necessary for equalizing the power intensity Po with the set value S is calculated and set at the controller 22, output light having a more stable intensity can be obtained.

In addition, as shown in FIG. 12, an abnormality determination unit 95 which detects that a difference larger than a reference value is continuously generated between the detection signal Ps detected by the light-receiving device 20 during the operation and the set value S (or the correction value S') for a predetermined period of time and outputs an alarm signal is arranged. When occurrence of an abnormality is displayed or notified with a sound in accordance with the alarm signal, input of an inappropriate set value S, a decrease in output of the tunable wavelength light source caused by a degradation in semiconductor laser element, or abnormality in the power intensity tunable unit, the beam splitter, the light-receiving device, or the like can be immediately informed to the user.

In the above embodiment, part of a laser beam passing through the optical attenuator 15 is split by the beam splitter 19, and the intensity of the split light is detected. However, as in a tunable wavelength light source apparatus 100 shown in FIG. 13, the beam splitter 19 may be arranged between the tunable wavelength light source 11 and the optical attenuator 15. A split light beam from the beam splitter 19 is received by the light-receiving device 20, and a controller 22' controls the attenuation amount of the optical attenuator 15 on the basis of the detection signal Ps and the set value S, thereby controlling the power intensity to be constant.

However, this control is not feedback control, unlike the above embodiment. Therefore, when the optical attenuator 15 itself exhibits a change in characteristics of attenuation amount due to a change in environment (e.g., a change in ambient temperature) or a difference in wavelength of input light, or non-linearity of characteristics with respect to the control signal, the power intensity may vary.

To suppress such variations in output, a change in characteristics of the optical attenuator 15 with respect to a change in environment (e.g., a change in temperature), a change in characteristics caused by the difference in wavelength, or non-linearity of characteristics with respect to the control signal is measured in advance, and the measurement result is stored in a variable portion information memory 101. When a wavelength/intensity setting device 102 reads information corresponding to the externally set wavelength information λ, the set value S, and information from a temperature sensor (not shown) from the reflectance information memory device 91, the sensitivity information memory device 92, and the variable portion information memory 101, and sets the correction value S' calculated in consideration of a change in wavelength, a change in environment, and the linearity of the optical attenuator 15 at the controller 22', the intensity of light output from the optical attenuator 15 can be controlled to be constant.

Figure 8B:
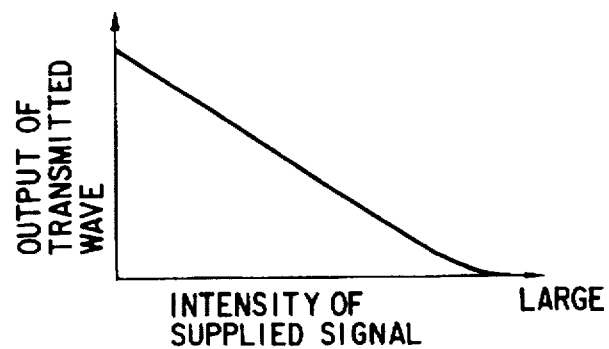
Figure 13:
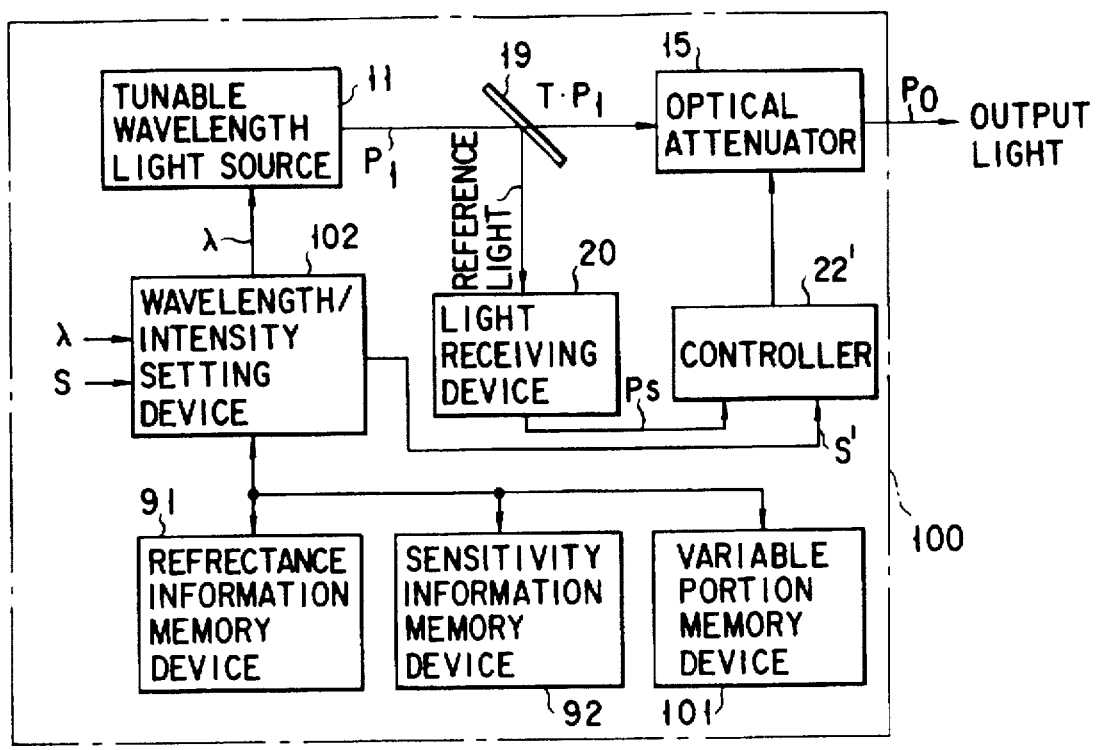
FIG. 13 is a block diagram showing the overall arrangement of still another embodiment of the present invention.

In place of the tunable wavelength light source 11 of the tunable wavelength light source apparatus 80, 90, or 100 shown in FIGS. 10, 11, or 13, the tunable wavelength light source 30 or 40 shown in FIGS. 5A or 5B may also be used. In place of the optical attenuator 15, the optical attenuator 51 in FIG. 6, the MZ interference modulator 60 in FIG. 7, the optical modulator 70 in FIG. 8, or the optical amplifier 76 in FIG. 9 may also be used.

Figure 14:
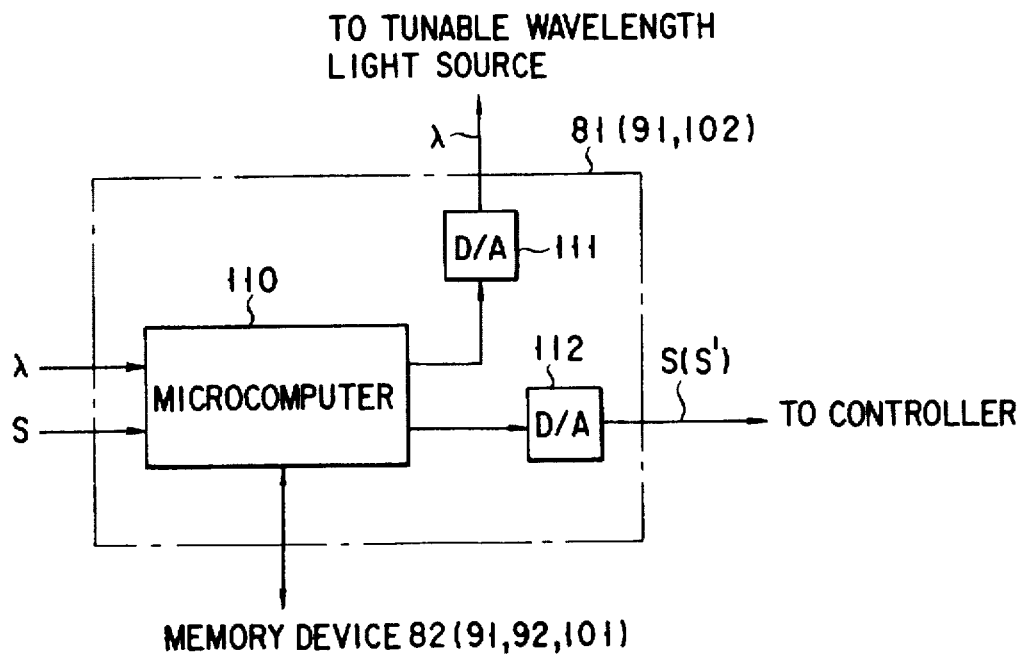
FIG. 14 is a block diagram showing the arrangement of the main part of still another embodiment of the present invention.
Figure 15:
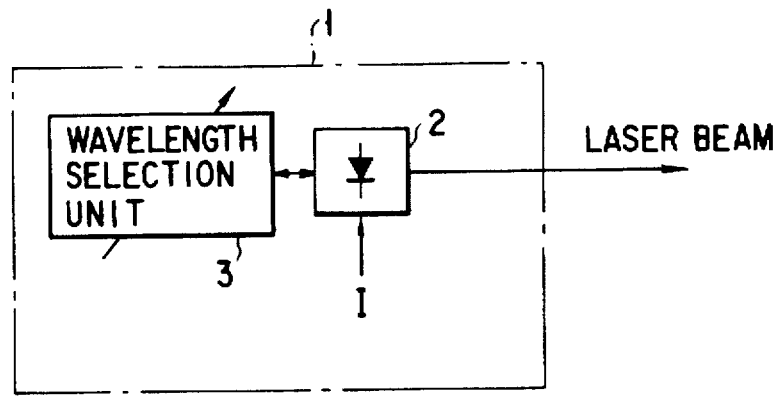
FIG. 15 is a block diagram schematically showing the arrangement of the main part of a conventional apparatus.
Figure 16:
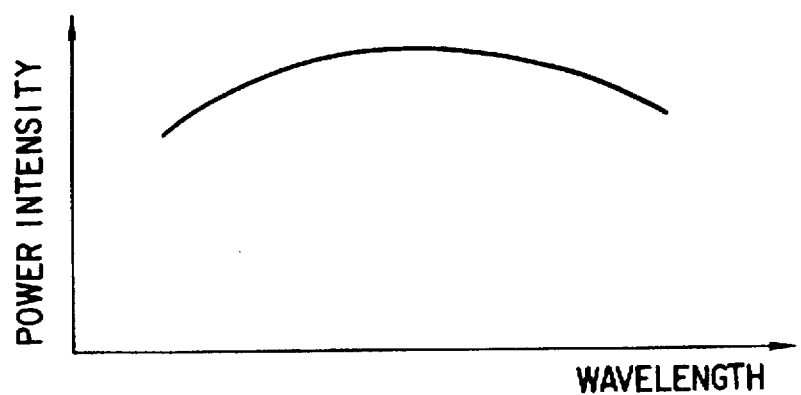
FIG. 16 is a graph showing a change in power intensity with respect to the wavelength in the conventional apparatus.

The wavelength/intensity setting devices 81, 93, and 102 shown in FIGS. 10, 11, and 13 may also be constituted such that, after determination and correction of the wavelength information λ or the power intensity set value S input from an operating unit (not shown) are performed by a microcomputer 110, the information is output to the tunable wavelength light source 11 or the controller 22 through a D/A converter 111 or 112, as shown in FIG. 14.

As has been described above, according to the present invention, there is provided a tunable wavelength light source apparatus comprising power intensity variable means for receiving a laser beam output from a tunable wavelength light source, attenuating or amplifying the intensity of the laser beam at an attenuation amount or amplification factor according to a control signal, and outputting the laser beam, beam splitting means for splitting the laser beam output from the tunable wavelength light source at the rear or front stage of the power intensity variable means, power intensity detection means for receiving the split laser beam and detecting the intensity, and control means for changing the control signal for the power intensity variable means to control such that the laser beam output from the power intensity variable means has a predetermined intensity.

In summary, the tunable wavelength light source apparatus of the present invention can output a laser beam having a predetermined intensity with respect to a change in wavelength without causing mode hopping of the laser beam output from the tunable wavelength light source or wavelength fluctuation. Therefore, the tunable wavelength light source apparatus can be used as a light source for highly accurate optical measurement.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A tunable wavelength light source apparatus comprising:
   a tunable wavelength light source for outputting a laser beam whose wavelength can be tuned;
   power intensity variable means for varying an intensity of the laser beam from said tunable wavelength light source;
   a beam splitter for splitting the laser beam into an output light component and a reference light component at a rear or front stage of said power intensity variable means;
   a light receiver for receiving the reference light component split by said beam splitter to detect a power intensity;
   control means for controlling said power intensity variable means so as to coincide a power intensity detection signal from said light receiver a set value corresponding to a desired power intensity, such that the power intensity of the output light component output from said beam splitter directly or through said power intensity variable means coincides with the desired power intensity; and
   wherein said tunable wavelength light source comprises:
   a semiconductor laser element having one end from which the laser beam is output, another end, and an active layer, and driven with a predetermined current injected to said active layer;
   a wavelength selection unit arranged on the one end side of said semiconductor laser element; and
   a lens unit for collimating the laser beam output from said another end of said semiconductor laser element and externally outputting the laser beam; and
   a wavelength setting device for setting a wavelength of the laser beam oscillated by said semiconductor laser element at a desired wavelength by externally changing an optical condition of said wavelength selection unit.

2. An apparatus according to claim 1, wherein said wavelength selection unit comprises:
   a further lens unit for collimating the laser beam output from said one end of said semiconductor laser element; and a diffraction grating for receiving the laser beam collimated by said further lens unit and returning only a laser component having the desired wavelength to said semiconductor laser element.

3. An apparatus according to claim 1, wherein said power intensity variable means includes an optical attenuator.

4. An apparatus according to claim 3, wherein said optical attenuator comprises:
   a Faraday element for rotating a plane of polarization of the laser beam from said tunable wavelength light source by an angle corresponding to an intensity of an applied magnetic field;
   a coil for applying the magnetic field to said Faraday element in accordance with a control signal from said control means; and
   a polarization device for outputting only a laser component of the laser beam passing through said Faraday element, the laser component having a predetermined plane of polarization.

5. An apparatus according to claim 3, wherein said optical attenuator comprises:
   a liquid crystal element for rotating a plane of polarization of the laser beam from said tunable wavelength light source in accordance with a voltage corresponding to a control signal from said control means; and
   a polarization device for outputting only a laser component of the laser beam passing through said liquid crystal element, the laser component having a predetermined plane of polarization.

6. An apparatus according to claim 1, wherein said power intensity variable means includes an interferometer.

7. An apparatus according to claim 6, wherein said interferometer includes a Mach-Zender (MZ) interference modulator.

8. An apparatus according to claim 7, wherein said MZ interference modulator comprises:
   a lithium niobate (LN) crystal plate;
   an input waveguide arranged on one end side of a surface of said LN crystal plate;
   a Y branch portion arranged to be connected to a distal end of said input waveguide on said surface of said LN crystal plate;
   two waveguides substantially parallelly arranged to be connected to said Y branch portion on said surface of said LN crystal plate;
   a Y coupling portion arranged to couple distal ends of said two waveguides on said surface of said LN crystal plate;
   an output waveguide arranged to be connected to said Y coupling portion on the other end side of said surface of said LN crystal plate; and
   a pair of electrodes arranged to apply an electric field to one of said two waveguides on said surface of said LN crystal plate.

9. An apparatus according to claim 1, wherein said power intensity variable means includes an optical modulator.

10. An apparatus according to claim 9, wherein said optical modulator comprises:
    a piezoelectric substrate;
    a surface acoustic wave (SAW) transducer formed on a surface of said piezoelectric substrate;
    a non-piezoelectric thin film waveguide arranged on an upper surface of said SAW transducer;
    an input grating coupler formed on one end side of said non-piezoelectric thin film waveguide; and an output grating coupler formed on another end side of said non-piezoelectric thin film waveguide.

11. An apparatus according to claim 1, wherein said power intensity variable means includes an optical amplifier.

12. An apparatus according to claim 1, wherein said apparatus further comprises a wavelength/intensity setting unit for setting a wavelength of a to-be-output laser beam to said tunable wavelength light source and outputting a set value corresponding to the desired power intensity to said control means in accordance with an external instruction.

13. An apparatus according to claim 12, wherein said apparatus further comprises:

a wavelength/intensity characteristic memory for storing wavelength vs. intensity information of the laser beam output from said tunable wavelength light source in advance, and said wavelength/intensity setting unit performs determination processing with respect to the external instruction by referring to the wavelength vs. intensity information from said wavelength/intensity characteristic memory.

14. An apparatus according to claim 12, wherein said apparatus further comprises:

a reflectance information memory for storing reflectance information for each wavelength of said beam splitter in advance; and a sensitivity information memory sensitivity for storing sensitivity information for each wavelength of said light receiver in advance, and said wavelength/intensity setting unit performs correction processing of the set value corresponding to the desired power intensity by referring to the reflectance information from said reflectance information memory and the sensitivity information from said sensitivity information memory.

15. An apparatus according to claim 12, wherein said apparatus further comprises:

a variable portion information memory for storing variable portion information for said power intensity variable means in advance, and said wavelength/intensity setting unit performs correction processing of the set value corresponding to the desired power intensity by referring to the variable portion information from said variable portion information memory.

16. An apparatus according to claim 12, wherein said wavelength/intensity setting unit comprises:

a microcomputer for performing determination processing and correction processing according to the external instruction; and a converter for converting a digital output from said microcomputer to an analog signal and supplying the analog signal to said tunable wavelength light source and to said control means.

17. A tunable wavelength light source apparatus comprising:

a tunable wavelength light source for outputting a laser beam whose wavelength can be tuned;

power intensity variable means for varying an intensity of the laser beam from said tunable wavelength light source;

a beam splitter for splitting the laser beam into an output light component and a reference light component at a rear or front stage of said power intensity variable means; and a light receiver for receiving the reference light component split by said beam splitter to detect a power intensity;

control means for controlling said power intensity variable means so as to coincide a power intensity detection signal from said light receiver a set value corresponding to a desired power intensity, such that the power intensity of the output light component output from said beam splitter directly or through said power intensity variable means coincides with the desired power intensity; and wherein said tunable wavelength light source includes a tunable wavelength light source element in which a semiconductor laser element and a wavelength selection unit are integrally formed.

18. An apparatus according to claim 17, wherein said wavelength selection unit comprises:

a further lens unit for collimating the laser beam output from said one end of said semiconductor laser element; and a diffraction grating for receiving the laser beam collimated by said further lens unit and returning only a laser component having the desired wavelength to said semiconductor laser element.

19. An apparatus according to claim 17, wherein said power intensity variable means includes an optical attenuator.

20. An apparatus according to claim 19, wherein said optical attenuator comprises:

a Faraday element for rotating a plane of polarization of the laser beam from said tunable wavelength light source by an angle corresponding to an intensity of an applied magnetic field;

a coil for applying the magnetic field to said Faraday element in accordance with a control signal from said control means; and a polarization device for outputting only a laser component of the laser beam passing through said Faraday element, the laser component having a predetermined plane of polarization.

21. An apparatus according to claim 19, wherein said optical attenuator comprises:

a liquid crystal element for rotating a plane of polarization of the laser beam from said tunable wavelength light source in accordance with a voltage corresponding to a control signal from said control means; and a polarization device for outputting only a laser component of the laser beam passing through said liquid crystal element, the laser component having a predetermined plane of polarization.

22. An apparatus according to claim 17, wherein said power intensity variable means includes an interferometer.

23. An apparatus according to claim 22, wherein said interferometer includes a Mach-Zender (MZ) interference modulator.

24. An apparatus according to claim 23, wherein said Mz interference modulator comprises:

a lithium niobate (LN) crystal plate;

an input waveguide arranged on one end side of a surface of said LN crystal plate;

a Y branch portion arranged to be connected to a distal end of said input waveguide on said surface of said LN crystal plate;

two waveguides substantially parallelly arranged to be connected to said Y branch portion on said surface of said LN crystal plate;

a Y coupling portion arranged to couple distal ends of said two waveguides on said surface of said LN crystal plate;

an output waveguide arranged to be connected to said Y coupling portion on the other end side of said surface of said LN crystal plate; and a pair of electrodes arranged to apply an electric field to one of said two waveguides on said surface of said LN crystal plate.

25. An apparatus according to claim 17, wherein said power intensity variable means includes an optical modulator.

26. An apparatus according to claim 25, wherein said optical modulator comprises:

a piezoelectric substrate;

a surface acoustic wave (SAW) transducer formed on a surface of said piezoelectric substrate;

a non-piezoelectric thin film waveguide arranged on an upper surface of said SAW transducer;

an input grating coupler formed on one end side of said non-piezoelectric thin film waveguide; and an output grating coupler formed on another end side of said non-piezoelectric thin film waveguide.

27. An apparatus according to claim 17, wherein said power intensity variable means includes an optical amplifier.

28. An apparatus according to claim 17, wherein said apparatus further comprises a wavelength/intensity setting unit for setting a wavelength of a to-be-output laser beam to said tunable wavelength light source and outputting a set value corresponding to the desired power intensity to said control means in accordance with an external instruction.

29. An apparatus according to claim 28, wherein said apparatus further comprises:

a wavelength/intensity characteristic memory for storing wavelength vs. intensity information of the laser beam output from said tunable wavelength light source in advance, and said wavelength/intensity setting unit performs determination processing with respect to the external instruction by referring to the wavelength vs. intensity information from said wavelength/intensity characteristic memory.

30. An apparatus according to claim 28, wherein said apparatus further comprises:

a reflectance information memory for storing reflectance information for each wavelength of said beam splitter in advance; and a sensitivity information memory for storing sensitivity information for each wavelength of said light receiver in advance, and said wavelength/intensity setting unit performs correction processing of the set value corresponding to the desired power intensity by referring to the reflectance information from said reflectance information memory and the sensitivity information from said sensitivity information memory.

31. An apparatus according to claim 28, wherein said apparatus further comprises:

a variable portion information memory for storing variable portion information for said power intensity variable means in advance, and said wavelength/intensity setting unit performs correction processing of the set value corresponding to the desired power intensity by referring to the variable portion information from said variable portion information memory.

32. An apparatus according to claim 28, wherein said wavelength/intensity setting unit comprises:

a microcomputer for performing determination processing and correction processing according to the external instruction; and a converter for converting a digital output from said microcomputer to an analog signal and supplying the analog signal to said tunable wavelength light source and to said control means.

33. A tunable wavelength light source apparatus comprising:

a tunable wavelength light source for outputting a laser beam whose wavelength can be tuned;

power intensity variable means for varying an intensity of the laser beam from said tunable wavelength light source;

a beam splitter for splitting the laser beam into an output light component and a reference light component at a rear or front stage of said power intensity variable means;

a light receiver for receiving the reference light component split by said beam splitter to detect a power intensity;

control means for controlling said power intensity variable means so as to coincide a power intensity detection signal from said light receiver a set value corresponding to a desired power intensity, such that the power intensity of the output light component output from said beam splitter directly or through said power intensity variable means coincides with the desired power intensity; and abnormality determination means for performing abnormality processing when the power intensity detection signal from said light receiver detects that a difference larger than a reference value is continuously generated with respect to the set value corresponding to the desired power intensity for a predetermined period of time.

* * * * *